US010118326B2

(12) United States Patent
Washburn

(10) Patent No.: US 10,118,326 B2
(45) Date of Patent: Nov. 6, 2018

(54) INJECTION MOLD FLASH REDUCTION

(71) Applicant: Sensata Technologies, Inc., Attleboro, MA (US)

(72) Inventor: Keith R. Washburn, Holliston, MA (US)

(73) Assignee: Sensata Technologies, Inc., Attleboro, MA (US)

(*) Notice: Subject to any disclaimer, the term of this patent is extended or adjusted under 35 U.S.C. 154(b) by 587 days.

(21) Appl. No.: 14/677,383

(22) Filed: Apr. 2, 2015

(65) Prior Publication Data

US 2016/0288384 A1 Oct. 6, 2016

(51) Int. Cl.
*B29C 45/00* (2006.01)
*B29C 45/26* (2006.01)
(Continued)

(52) U.S. Cl.
CPC .... *B29C 45/0025* (2013.01); *B29C 45/14344* (2013.01); *B29C 45/26* (2013.01);
(Continued)

(58) Field of Classification Search
CPC ...... B29C 2045/0034; B29C 45/14344; B29C 2045/0037; B29C 45/0025; B29C 45/14; B29C 45/14008
(Continued)

(56) References Cited

U.S. PATENT DOCUMENTS 3,077,003 A * 2/1963 Hobson .................. B29C 45/14
264/275
3,593,381 A * 7/1971 Ogle ....................... B29C 45/02
425/195
(Continued)

FOREIGN PATENT DOCUMENTS

EP 0 816 939 A2 1/1998
EP 1 775 509 A1 4/2007
(Continued)

OTHER PUBLICATIONS

European Search Report, EP 16 16 1773, dated Aug. 8, 2016, pp. 3.

*Primary Examiner* — Philip C Tucker
*Assistant Examiner* — Jimmy R Smith, Jr.
(74) *Attorney, Agent, or Firm* — Burns & Levinson LLP; Joseph M. Maraia; George N. Chaclas

(57) ABSTRACT

A mold fabrication element has a hollowed volume defining a respective continuous inner surface. A fabricator resource disposes the mold fabrication element into a cavity of an injection mold assembly; surface contours on the inner surface of cavity as well as the respective continuous inner surface of the mold fabrication element exposed in the cavity define an outer surface of a resulting injection molded part. To create the injection molded part, the fabricator resource injects liquefied material into the cavity. The injected material contacts the continuous inner surface of the hollowed volume in the mold fabrication element as well as the surface contours of the cavity. After the injected material solidifies, the fabricator resource removes a combination of the injection molded part and the mold fabrication element. The fabricator resource separates the mold fabrication element from the injection molded part for further processing and use of the injection molded part.

11 Claims, 7 Drawing Sheets

(51) Int. Cl.
*B29C 45/14* (2006.01)
*B29L 23/00* (2006.01)
*B29K 705/00* (2006.01)

(52) U.S. Cl.
CPC .... *B29C 45/261* (2013.01); *B29C 2045/0034* (2013.01); *B29C 2045/0037* (2013.01); *B29K 2705/00* (2013.01); *B29L 2023/00* (2013.01)

(58) Field of Classification Search
USPC .......... 425/DIG. 58, 460, DIG. 111; 264/318
See application file for complete search history.

(56) References Cited

U.S. PATENT DOCUMENTS

| | | | |
|---|---|---|---|
| 5,804,123 A * | 9/1998 | Klomhaus | B29C 45/4407 264/318 |
| 2006/0022384 A1 | 2/2006 | Mathew | |
| 2009/0151145 A1 | 6/2009 | Bousquet | |
| 2014/0302975 A1 * | 10/2014 | Arai | B29C 45/1615 492/39 |

FOREIGN PATENT DOCUMENTS

| | | |
|---|---|---|
| JP | 2005 238642 A | 9/2005 |
| WO | 2012/022918 A1 | 2/2012 |

\* cited by examiner

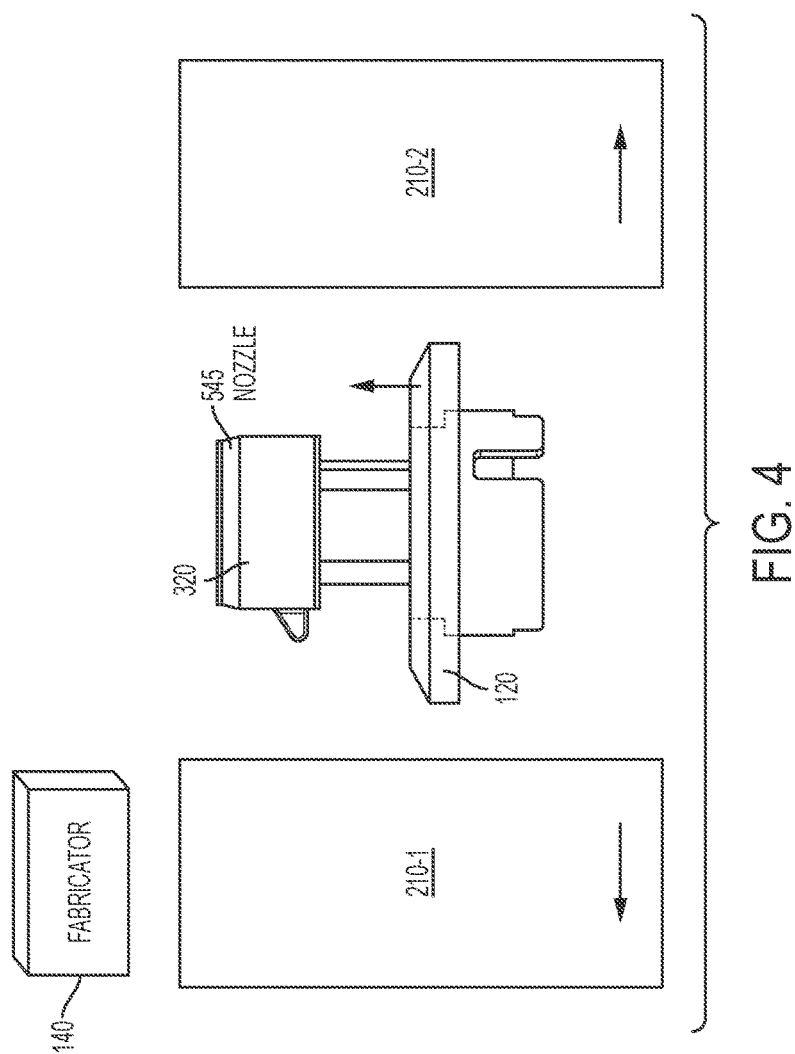

INJECTION MOLD FLASH REDUCTION

BACKGROUND

Conventional injection molding techniques typically rely on use of a multi-side mold assembly including at least a first side and a second side to create a respective injection molded part.

As an illustrative example, to create a respective injection molded part, the first side of the mold assembly is joined to a second side of the mold assembly. It is well known that contours on the inner wall surfaces in a respective cavity formed by the first side of the mold and the second side of the mold define the outer surfaces of the respective resulting injection molded part. Subsequent to creating a cavity by joining one or more sides the mold assembly, molten material is then injected through one or more ports of the mold into a respective cavity of the mold assembly. Eventually, after the injected liquid material, such as plastic, has solidified in the cavity, the one or more sides of the mold assembly are pulled away from each other, releasing the molded part for further handling.

Although conventional injection molding is useful, parts fabricated using conventional injection molding techniques typically include imperfections that must be corrected prior to use of the molded part in a final assembly. For example, injection molded plastic parts typically include imperfections (unwanted material) such as flash and/or burrs that result from unavoidable gaps present along the parting lines of the sides of the mold assembly. To make the part usable in a particular application, a fabricator must typically remove the flash or burrs using a tool such as a grinder.

BRIEF DESCRIPTION

In certain instances, presence of the flash or burrs in an injection molded part renders the part unusable in a particular application. For example, a manufacturer may desire to use the injection molded part in an application requiring a sealed interface to prevent passing of fluid. Presence of the flash material or burrs (one or more non-smooth surfaces) as a result of injection molding may prevent a rubber gasket (or other suitable component) in contact with the flash or burr from providing a leak-proof seal.

In contrast to conventional applications, embodiments herein include unique ways of reducing presence of flash or burrs certain regions of injection molded parts.

More specifically, in one embodiment, a fabricator resource receives a supplemental mold fabrication element (such as a supplemental ring element, washer, etc.) for use in the injection mold process. In one embodiment, the mold fabrication element has a hollowed volume defining a respective continuous inner surface. The fabricator resource disposes the mold fabrication element into a cavity of a mold assembly (such as a multi-sided mold assembly).

As a further example embodiment, the mold assembly can be configured to include at least a first mold side and a second mold side. The first mold side and the second mold side are joined together to form the cavity in which to manufacture a respective injection molded part. The first mold side can be configured to include a void to receive and retain a first portion of the mold fabrication element; the second mold side can be configured to include a void to receive and retain a second portion of the mold fabrication element.

Disposing the mold fabrication element into the cavity of the mold assembly can include inserting the first portion of the mold fabrication element into the void of the first mold side and then joining the first mold side to the second mold side to produce the cavity. As mentioned, the void in the first mold side and the void in the second mold side retain the mold fabrication element in a desired location of the cavity.

In accordance with further embodiments, a combination of exposed surface contours in the cavity of the mold assembly and the respective continuous inner surface of the mold fabrication element define an outer surface of a respective injection molded part manufactured in the cavity. In other words, as further discussed herein, the respective continuous inner surface (such as a stepped surface region of varying diameters) of the mold fabrication element can be exposed in the cavity (prior to injection of liquefied material) to create at least one outer surface of the respective injection molded part.

In furtherance of creating a respective injection molded part, the fabricator resource injects material into the cavity of the multisided mold assembly to create a molded part. The injected material contacts the surface contours of the cavity defined by contours of the multi-sided mold assembly as well as contours of the continuous inner surface of the hollowed volume in the mold fabrication element.

Subsequent to injecting the material into the cavity to create the molded part, and after the injected material solidifies, the fabricator resource separates at least the first side of the multi-sided mold assembly from the second side of the multi-sided mold assembly to remove a combination of the injection molded part and the mold fabrication element. The fabricator resource then removes the mold fabrication element (such as a washer resource) from the corresponding injection molded part for further use in a component assembly.

As further discussed herein, the mold fabrication element can be a ring, loop, washer, etc., including a stepped inner surface of multiple diameters. The stepped inner surface of the mold fabrication element produces a corresponding stepped outer surface region in the resulting molded part. The resulting stepped outer surface region in the molded part is a region free of flash or burrs otherwise produced by injection of the material between gaps (caused by parting lines) in between movable sides (such as a first side and corresponding second side) of the mold assembly.

As a more specific example, in accordance with yet further embodiments, a parting line of the first mold side and the second mold side can be disposed substantially orthogonal with respect to a planar orientation in which the mold fabrication element resides in the cavity of the mold assembly. The parting line of the mold assembly, to separate the sides of the molding assembly to remove the molded part from the cavity, can be configured to extend in a first orientation such as along an axial length of the molded part; a second orientation (such as orthogonal respect to the first orientation) of the mold fabrication element in the cavity of the mold assembly produces a corresponding flash-free region in the molded part.

In one non-limiting example embodiment, the flash-free region in the resulting injection molded part provides a smooth continuous surface (such as a circular stepped surface of multiple diameters) on the resulting molded part in which to create a seal (or other suitable precisely detailed type of interface).

These and other embodiment variations are discussed in more detail below.

Note that embodiments herein can include a configuration of one or more computerized devices, hardware processor devices, assemblers, or the like to carry out and/or support any or all of the method operations disclosed herein. In other words, one or more computerized devices, processors, digital signal processors, assemblers, etc., can be programmed and/or configured to perform any of the operations or methods as discussed herein.

Additionally, although each of the different features, techniques, configurations, etc., herein may be discussed in different places of this disclosure, it is intended that each of the concepts can be executed independently of each other or in combination with each other. Accordingly, the one or more present inventions, embodiments, etc., as described herein can be embodied and viewed in many different ways.

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention (s), the reader is directed to the Detailed Description section and corresponding figures of the present disclosure as further discussed below.

BRIEF DESCRIPTION OF THE DRAWINGS

FIG. 4 is an example diagram illustrating removal of a respective injection molded part and corresponding mold fabrication element from a mold assembly according to embodiments herein.

Figure 2:
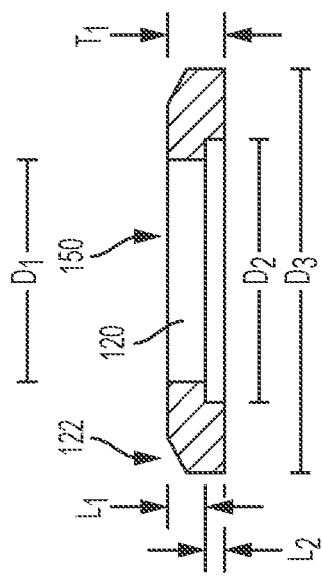
FIG. 2 is an example side view cutaway diagram illustrating attributes of the supplemental mold fabrication element according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Embodiments herein include a supplemental mold fabrication element for use in an injection molding system. The mold fabrication element has a hollowed volume defining a respective continuous inner surface. A fabricator resource disposes the mold fabrication element into a cavity of an injection mold assembly; surface contours on the inner surface of cavity as well as the respective continuous inner surface of the mold fabrication element exposed in the cavity define an outer surface of a resulting injection molded part. To create the injection molded part, the fabricator resource injects liquefied material into the cavity. The injected material contacts the continuous inner surface of the hollowed volume in the mold fabrication element as well as the surface contours of the cavity. After the injected material solidifies, the fabricator resource removes a combination of the injection molded part and the mold fabrication element. The fabricator resource separates the mold fabrication element from the injection molded part for further processing of the injection molded part.

Use of the mold fabrication element as described herein reduces presence of flash or burrs in certain regions of injected molded parts, rending the part useful for certain applications. More specifically, as further discussed below, flash-free regions of a respective injection molded part can be used for any suitable purpose such as creating a leak-free seal.

Figure 1:
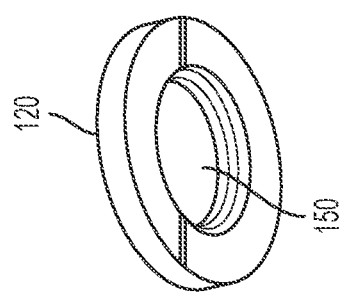
FIG. 1 is an example perspective diagram of a supplemental mold fabrication element for use in a injection mold fabrication system according to embodiments herein.

Now turning to the figures, FIG. 1 is an example perspective view diagram of a mold fabrication element according to embodiments herein.

In this example embodiment, the mold fabrication element 120 is shaped like a washer, ring, etc. However, note that the mold fabrication element 120 can be any suitable shape to perform the operations as discussed herein.

As further shown, the mold fabrication element 120 includes hollowed volume 150 defining a respective continuous inner surface (such as a stepped inner surface) of the mold fabrication element 120. In one embodiment, the stepped diameter in the hollowed volume 150 of the mold fabrication element 120 defines a respective outer surface of a portion of an injection molded part as further discussed below.

FIG. 2 is an example side view cutaway diagram of a mold fabrication element according to embodiments herein.

As shown, the mold fabrication element 120 has an overall thickness of T1 and can be configured to include stepped inner surface region of varying diameters. For example, a first portion of the hollowed volume 150 in the mold fabrication element 150 as defined by dimension L2 has a diameter of D2. A second portion of the hollowed volume 150 as defined by dimension L1 has a diameter of D1. As shown, the diameter D2 is greater than the diameter D1.

As further shown, if desired, the mold fabrication element 120 can include a chamfer 122. The mold fabrication element 120 can be fabricated to include the chamfer 122 for a number of different reasons. For example, the chamfer 122 can serve as a key such that the mold fabrication element 120 is oriented properly during use. Additionally, the chamfer 122 provides a visual indication of which side of the mold fabrication element 120 includes the smaller diameter D1.

Note that the mold fabrication element 120 can be fabricated from any suitable type of material. In one embodiment, the mold fabrication element 120 is fabricated from metal such as steel, copper, aluminum, etc.

Figure 3:
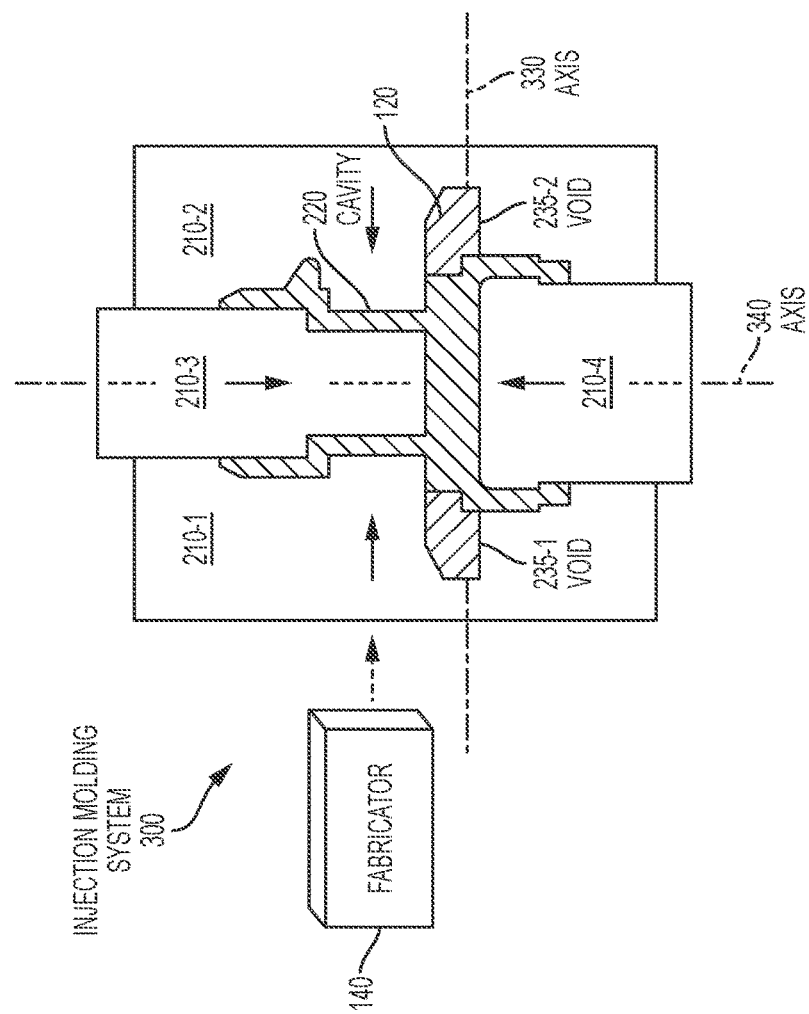
FIG. 3 is an example cutaway side view diagram illustrating contours of a cavity defined by a mold assembly and corresponding supplemental mold fabrication element according to embodiments herein.

FIG. 3 is an example side view diagram of using the mold fabrication element in a cavity of a mold assembly according to embodiments herein.

As shown, injection molding system 300 includes a fabricator resource 140 as well as a corresponding multi-sided mold assembly 210.

Mold assembly 210 can be configured to include any number of sides defining corresponding cavity 220 to produce a respective injection molded part. For example, in this embodiment, the mold assembly 210 includes side 210-1 (a first mold side), side 210-2 (a second mold side), side 210-3 (a third mold side), and side 210-4 (a fourth mold side). Each of the sides of the mold assembly 210 defines the one or more surface contours of the respective injection molded part being fabricated.

Fabricator resource 140 controls functions such as movement of the mold sides 210-1, 210-2, 210-3, 210-4, etc., to create the injection mold cavity 220. In this example embodiment, the parting lines between mold side 210-1 and mold side 210-2 are parallel to access 340. As previously discussed, the resulting injection molded part is susceptible to having flash or burrs along the parting lines of the mold assembly.

In the embodiment shown, the fabricator resource 140 receives a supplemental mold fabrication element 120 (such as a supplemental ring element, washer, etc.) for use in the injection molding process. The fabricator resource 140 disposes the mold fabrication element 120 into a cavity 220 of the mold assembly 210.

As shown in this non-limiting example embodiment, the mold fabrication element 120 (which is relatively planar itself) resides within a respective plane parallel to axis 330. Axis 330 is substantially orthogonal with respect to axis 340. In one embodiment, the axis 330 defines an axial length of the injection molded part produced in the cavity 220.

To create the cavity 220, the fabricator resource 140 at least joins the first mold side 210-1 to the second mold side 210-2 to form the cavity 220 in which to manufacture a respective injection molded part. As shown, the first mold side 210-1 can be configured to include a void 235-1 to receive and retain a first portion of the mold fabrication element 120; the second mold side 210-2 can be configured to include a void 235-2 to receive a second portion of the mold fabrication element 120.

Although any suitable technique can be implemented, disposing the mold fabrication element 120 into the cavity 220 of the mold assembly 210 can include inserting the first portion of the mold fabrication element 120 into the void 235-1 of the first mold side 210-1 and then joining the first mold side 210-1 to the second mold side 210 to produce the overall cavity 220 defining contours of the yet to be fabricated injection molded part.

The voids 235 in mold assembly 210 retain the mold fabrication element 120 in a desired location of the cavity 220 such that the resulting injection molded part includes desired contours. More specifically, a combination of exposed surface contours in the cavity 220 of the mold assembly 210 and the respective continuous inner surface (such as a stepped inner surface of multiple diameters) of the mold fabrication element 120 define an outer surface of a respective injection molded part manufactured in the cavity 220. In other words, as discussed herein, the respective continuous inner surface of the mold fabrication element 120 is exposed in the cavity 220 to create at least one outer surface of the respective injection molded part to be fabricated.

In furtherance of creating a respective injection molded part, subsequent to joining respective sides to create the mold assembly 210, the fabricator resource 140 injects liquefy material such as plastic, epoxy, etc., into the cavity 220 of the multisided mold assembly 210 to create the respective injection molded part. The material injected into the cavity 220 contacts the surface contours of the cavity 220 defined by the multi-sided mold assembly 210 as well as contours defined by the continuous inner surface (such as stepped region of multiple different diameters) of the hollowed volume 150 in the mold fabrication element 120.

FIG. 4 is an example diagram illustrating removal of the injection molded part from the mold assembly according to embodiments herein.

As shown, subsequent to injecting the material into the cavity 220 to create the molded part 320, and after the injected material solidifies in the cavity 220, the fabricator resource 140 withdraws the side 210-3, side 210-4 from the mold assembly 210. Additionally, the fabricator resource 140 separates the first side 210-1 of the multi-sided mold assembly 210 from the second side 210-2 of the multi-sided mold assembly 210 to remove a combination of the injection molded part 320 and the mold fabrication element 120.

In one embodiment, the material used to create the injection molded part 320 shrinks after it cools such that mold fabrication element 120 is easily separated from the injection molded part 320. As shown, via an upward motion of the mold fabrication element 120 with respect to the injection molded part 320, the mold fabrication element 120 can be removed from the injection molded part 320. Nozzle 545 is sufficiently small in diameter to enable complete separation of the mold fabrication element 120 from the injection molded part 320 such that the mold fabrication element 120 can be used again to create another injection molded part.

Figure 5B:
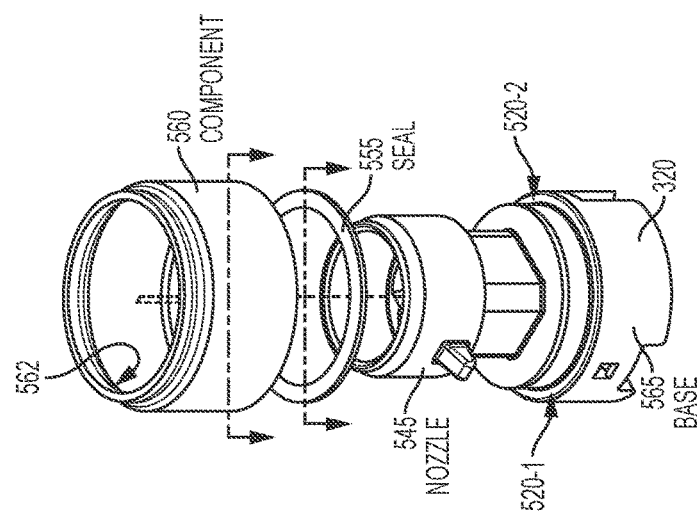
FIG. 5B is an example exploded view diagram of a component fabrication assembly including the injection molded part according to embodiments herein.
Figure 5A:
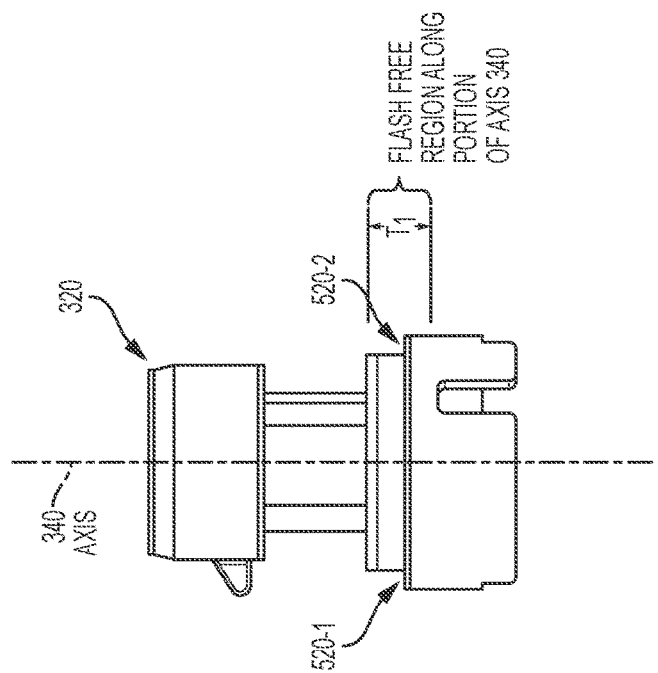
FIG. 5A is an example diagram illustrating a resulting injection molded part according to embodiments herein.

FIG. 5A is an example side view diagram of the injection molded part according to embodiments herein.

It should be noted that a parting line of the first mold side 210-1 and the second mold side 210-2 of mold assembly 210 can be disposed to be substantially orthogonal with respect to a planar orientation in which the mold fabrication element 120 resides in the cavity 220 of the mold assembly 210. The parting line of the mold assembly 210 for separating the sides of mold assembly 210 extends in a first orientation (such as long axis 340 or as along an axial length of the molded part); the mold fabrication element 150 in a second orientation (such as axis 330 substantially orthogonal with respect to the axis 340) in the cavity of the mold assembly produces a corresponding flash-free region in the injection molded part.

As previously discussed, the mold fabrication element 120 can be configured as a ring, loop, washer, etc., having a stepped inner surface of multiple diameters to produce a corresponding stepped outer surface regions 520-1 and 520-2 (collectively, surface region 520) on the resulting injection molded part 320. The resulting stepped outer surface regions 520 residing within thickness T1 is a region free of flash or burrs otherwise produced by injection of the material between gaps (parting lines) in between sides (e.g., the first side 210-1 and the second side 210-2) of the mold assembly 210.

Outside of thickness T1, along axis 340, the injection molded part 320 is susceptible to having flash or burrs along the parting line (such as parallel to axis 340) between mold side 210-1 and mold side 210-2. Presence of the mold fabrication element 120 in the cavity 220 in a manner as previously discussed advantageously reduces and/or eliminates presence of burrs or flash material in the stepped surface region 520 along both axis 330 or axis 340. In other words, the flash-free stepped surface region 520 in the resulting injection molded part 320 provides a smooth surface at a desired location on the resulting molded part 320 in which to create a seal (or other suitable precisely detailed type of interface) as further discussed below.

FIG. 5B is an example diagram illustrating use of the injection molded part according to embodiments herein.

As shown, when creating a final assembly using the injection molded part 320, the stepped outer surface region 520 of the injection molded part 320 provides a location on which to rest the seal 555 (such as a rubber O-ring, seal, or the like). Subsequent to sliding of the seal 555 past nozzle 545 of the injection molded part 320 and resting the seal 555 onto the stepped outer surface region 520 of the injection molded part 320, a respective assembler slides the component 560 (such as a cap, shield, housing, etc.) past nozzle 545 over the base 565 of the injection molded part 320. In such an instance, the seal 555 (compressed between the outer stepped surface region 520 and the inner stepped surface region 562) provides a leak-free interface.

Figure 6:
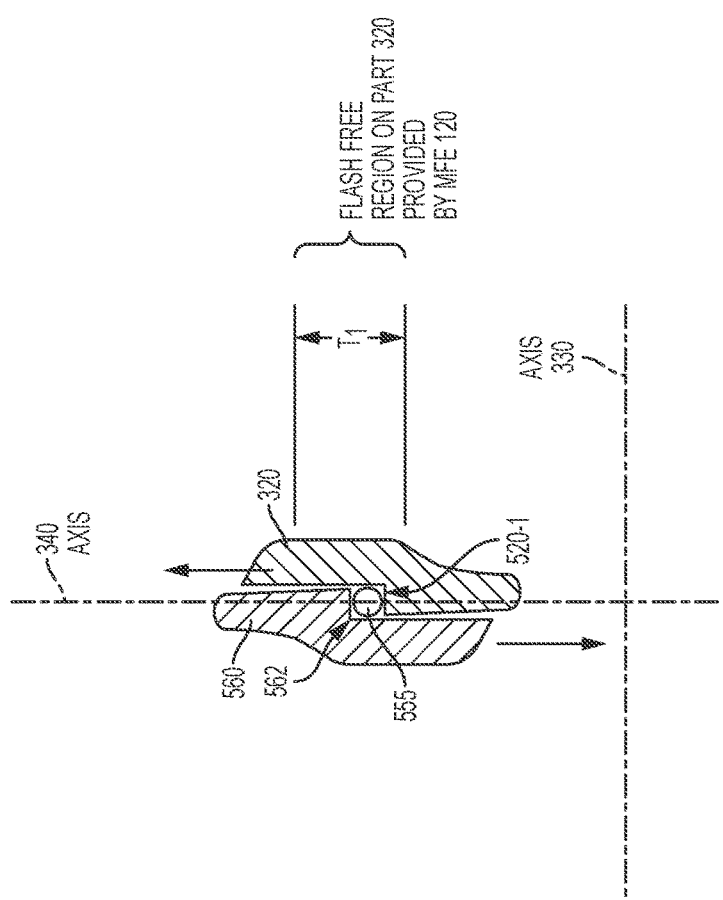
FIG. 6 is an example side view diagram illustrating fabrication of a seal on a component using the injection molded part according to embodiments herein.

FIG. 6 is an example close-up side view diagram illustrating a sealed interface according to embodiments herein.

As previously discussed, the region along axis 340 as defined by thickness T1 (the region of the injection molded part 320 as formed the by the mold fabrication element 120) is a flash-free region. This ensures that the circular shaped stepped outer surface region 520 is smooth about a respective diameter of the injection molded part 320.

Movement of the component 560 in an opposite direction to the injection molded part 320 as shown and previously discussed causes the inner stepped surface regions 562 to compress the seal 555 against the outer stepped surface region 520 surface disposed on the injection molded part 320, providing a leak-free seal. In other words, because there is no flash or burrs (from imperfect injection molding techniques) located in a layer T1 of the injection molded part 320 in contact with the seal 555, the respective sealed interface is less likely to leak fluid or require additional machining to make the outer stepped surface region 520 smooth enough for creating a reliable seal.

Figure 7:
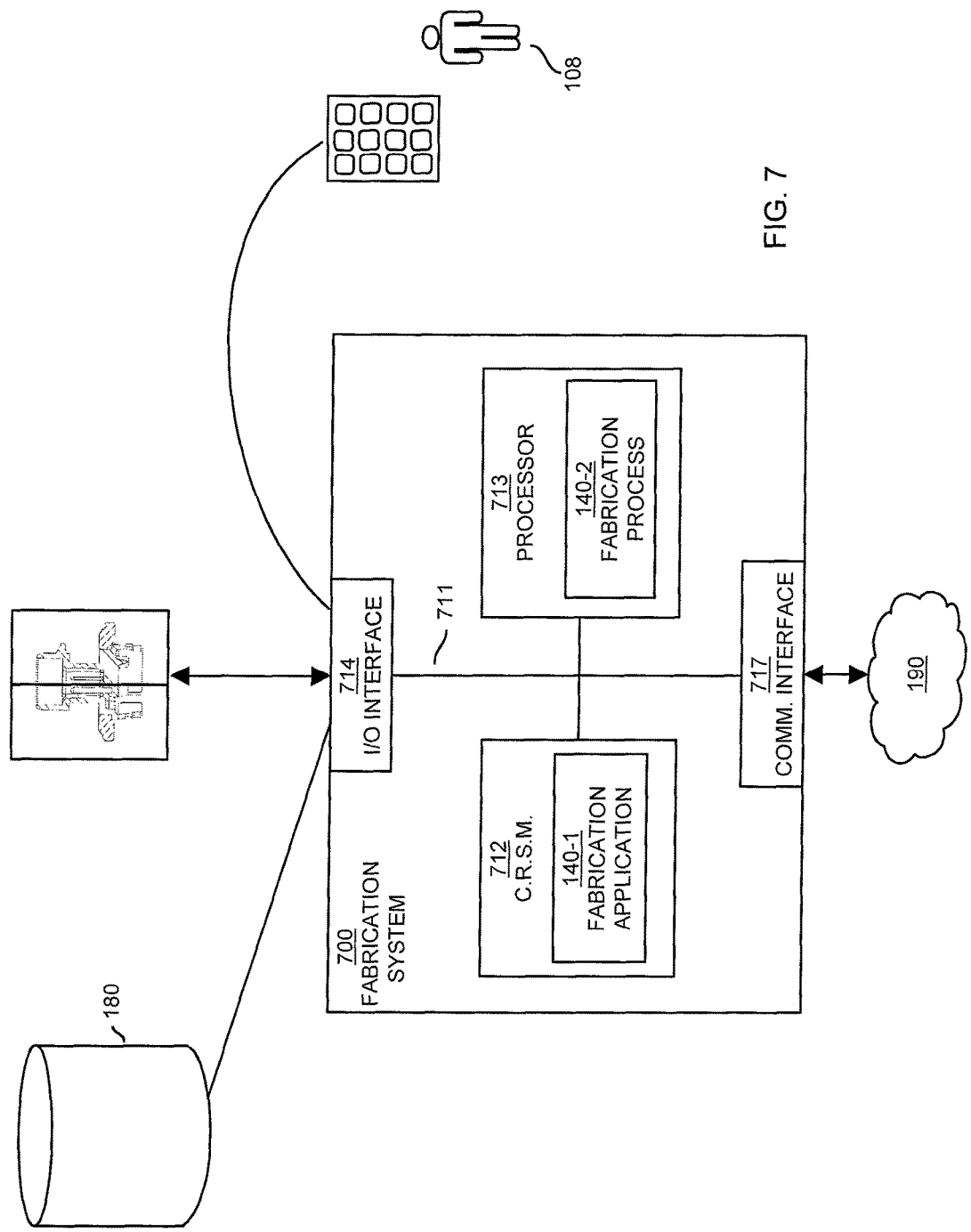
FIG. 7 is an example fabrication system diagram including computer processor hardware to execute operations according to embodiments herein.

FIG. 7 is an example block diagram of a fabrication system for implementing any of the operations as discussed herein according to embodiments herein.

As shown, fabrication system 700 (such as including one or more computers) of the present example includes an interconnect 711, a processor 713 (such as one or more processor devices, computer processor hardware, etc.), computer readable storage medium 712 (such as hardware storage to store instructions, data, information, etc.), I/O interface 714, and communications interface 717.

Interconnect 711 provides connectivity amongst processor 713, computer readable storage media 712, I/O interface 714, and communication interface 717.

I/O interface 714 provides connectivity to a repository 180 and, if present, other devices such as a playback device, display screen, input resources, a computer mouse, etc.

Computer readable storage medium 712 (such as a non-transitory hardware medium) can be any suitable hardware storage resource or device such as memory, optical storage, hard drive, rotating disk, etc. In one embodiment, the computer readable storage medium 712 stores instructions associated with fabrication application 140-1. Processor 713 (computer processor hardware) executes these instructions.

Communications interface 717 enables the fabrication system 700 and processor 713 (computer processor hardware) to communicate over a resource such as network 190 to retrieve information from remote sources and communicate with other computers. I/O interface 714 further enables processor 713 executing fabrication application 140-1 to retrieve stored information such as from repository 180.

As shown, and as previously discussed, computer readable storage media 712 is encoded with the fabrication application 140-1 (e.g., software, firmware, etc.) executed by processor 713 (hardware). Fabrication application 140-1 is configured to include instructions to implement any of the injection molding operations as discussed herein.

During operation of one embodiment, processor 713 (e.g., computer processor hardware) accesses computer readable storage media 712 via the use of interconnect 711 in order to launch, run, execute, interpret or otherwise perform the instructions in the fabrication application 140-1 stored on computer readable storage medium 712.

Execution of the fabrication application 140-1 produces processing functionality such as fabrication process 140-2 in processor 713. In other words, the fabrication process 140-2 associated with processor 713 represents one or more aspects of executing fabrication application 140-1 within or upon the processor 713 in the fabrication system 700.

Those skilled in the art will understand that the fabrication system 700 and corresponding processor 713 can include other processes and/or software and hardware components, such as an operating system that controls allocation and use of hardware resources to execute fabrication application 140-1.

In accordance with different embodiments, note that computer system may be any of various types of devices, including, but not limited to, a controller, a wireless access point, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 850 and its parts may reside at any of one or more locations or can be included in any suitable one or more resource in network environment 100 to implement functionality as discussed herein.

Functionality supported by the different resources will now be discussed via flowchart in FIG. 8. Note that the steps in the flowcharts below can be executed in any suitable order.

Figure 8:
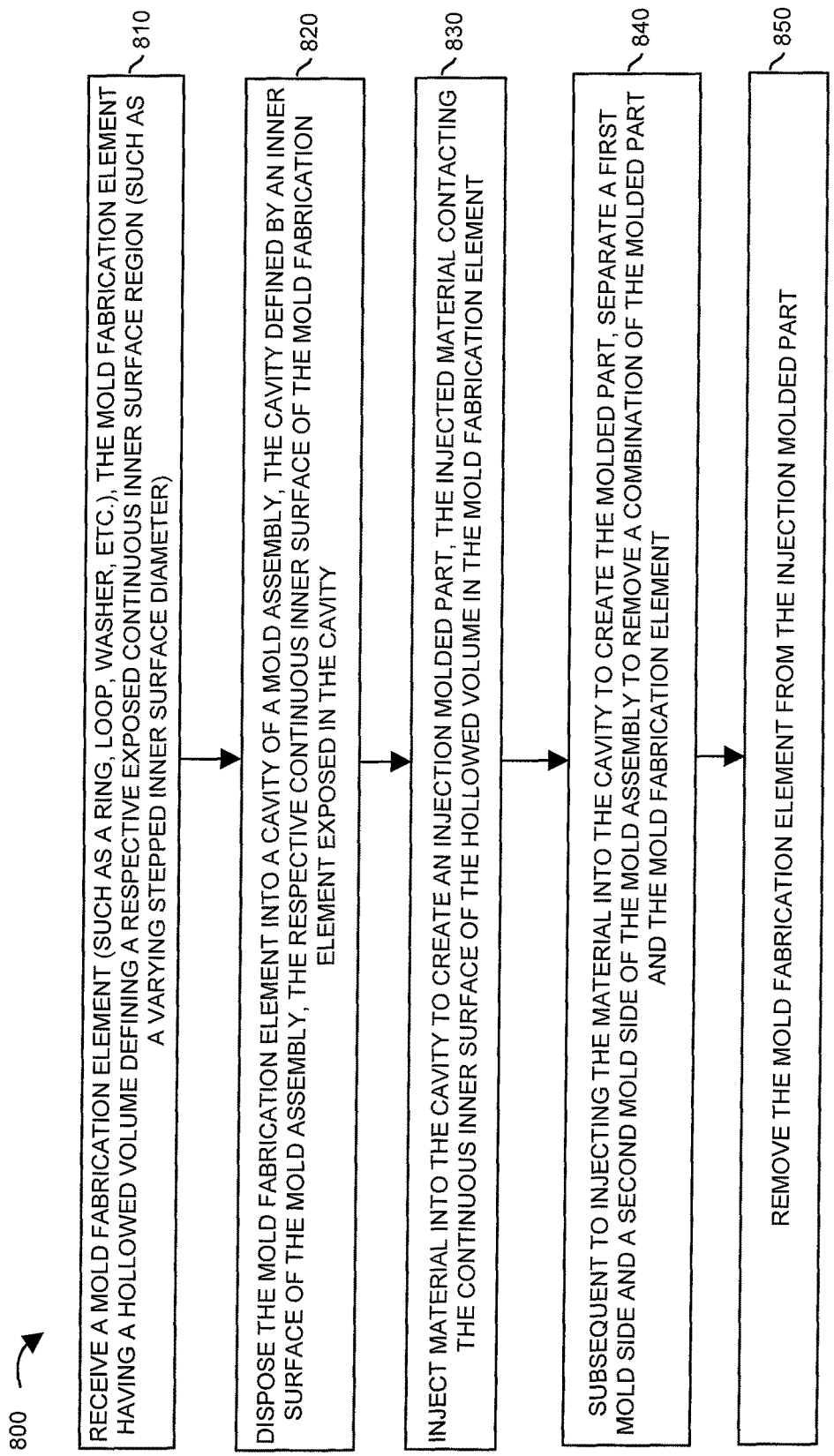
FIG. 8 is an example flowchart illustrating a method according to embodiments herein.

FIG. 8 is a flowchart 800 illustrating an example method according to embodiments. Note that there will be some overlap with respect to concepts as discussed above.

In processing block 810, the fabricator resource 140 receives mold fabrication element 120 (such as a ring, loop, washer, etc.). The mold fabrication element 140 has a hollowed volume 150 defining a respective exposed continuous inner surface region (such as a stepped or planar circular inner surface including multiple diameters D1 and D2).

In processing block 820, the fabricator resource 140 disposes the mold fabrication element 120 into a cavity 220 of the mold assemblies 210. The cavity 220 of the mold assembly 210 is at least partially defined by an inner surface of the mold assembly 210 as well as the respective continuous inner surface of the mold fabrication element 120 exposed in the cavity 220.

In processing block 830, the fabricator resource 140 injects liquefied material into the cavity 220 to create a respective injection molded part 320. The injected material contacts the continuous inner surface of the hollowed volume 150 in the mold fabrication element 120 as well as the contours of the inner surface of the cavity 220 as defined by the mold assembly 210.

In processing block 840, subsequent to injecting the material into the cavity 220 to create the respective injection molded part 320, such as after the injected material solidifies, the fabricator resource 140 separates the first mold side 210-1 and the second mold side 210-2 of the mold assembly 210 to remove a combination of the molded part 320 in the mold fabrication element 120.

In processing block 850, the fabricator resource 140 removes (separates) the mold fabrication element 120 from the injection molded part 320.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While one or more inventions have been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:
   receiving a mold fabrication element, the mold fabrication element having a hollowed volume defining a respective continuous inner surface;
   disposing the mold fabrication element into a cavity of a mold assembly, the cavity defined by an inner surface of the mold assembly, the respective continuous inner surface of the mold fabrication element exposed in the cavity; and
   injecting plastic into the cavity, the plastic hardening to form a molded part within the cavity, the molded part having a flash free region between two hollowed regions of the molded part, the flash free region formed along the continuous inner surface of the hollowed volume in the mold fabrication element,
   wherein a part line from separating the mold assembly to remove the molded part from the cavity extends along an axial length of the molded part, presence of the mold fabrication element in the cavity of the mold assembly producing a corresponding flash-free region in the molded part along a less-than-all portion of the axial length.

2. The method as in claim 1, wherein the mold fabrication element is a ring including a stepped inner diameter to produce a corresponding stepped region in the molded part.

3. The method as in claim 2, wherein the stepped region in the molded part is a region free of flash produced by injection of the plastic between gaps in between sides of the mold assembly.

4. The method as in claim 1, wherein the mold assembly includes a first mold side and a second mold side, the first mold side including a void to receive a first portion of the mold fabrication element, the second mold side including a void to receive a second portion of the mold fabrication element; and
   wherein disposing the mold fabrication element into the cavity of the mold assembly includes:
   inserting the first portion of the mold fabrication element into the void of the first mold side; and
   joining the first mold side to the second mold side to produce the cavity, the void of the first mold side and the void of the second mold side retaining the mold fabrication element in a desired location of the cavity.

5. The method as in claim 1, wherein the respective continuous inner surface of the hollowed volume of the mold fabrication element resides substantially within a plane.

6. The method as in claim 5, wherein the mold assembly includes a first mold side and a second mold side; and
   wherein disposing the mold fabrication element into the cavity of the mold assembly further comprises: moving the first mold side in a manner parallel to the plane to contact the first mold side to the second mold side of the mold assembly to form the cavity.

7. The method as in claim 6, wherein parting lines of the first mold side and the second mold side are disposed substantially orthogonal with respect to the plane of the mold fabrication element.

8. The method as in claim 1 further comprising:
   subsequent to injecting the plastic into the cavity to create the molded part, separating a first mold side and a second mold side of the mold assembly to remove a combination of the molded part and the mold fabrication element; and
   separating the mold fabrication element from the molded part.

9. The method as in claim 8, wherein removing the mold fabrication element from the molded part further comprises:
   sliding the mold fabrication element off an end of the molded part having a diameter that is smaller than a diameter of the respective continuous inner surface of the mold fabrication element.

10. The method of claim 1, wherein prior to injecting the plastic into the cavity, the cavity is further defined by an outer surface of at least one mold side.

11. The method of claim 1 wherein just prior to injecting plastic into the cavity, the cavity of the mold assembly is defined by at least four separate mold sides and the mold fabrication element.

* * * * *